No. 824,237. PATENTED JUNE 26, 1906.
H. E. DUBOIS.
CONTROLLER FOR ELECTRIC MOTORS.
APPLICATION FILED JAN. 20, 1906.
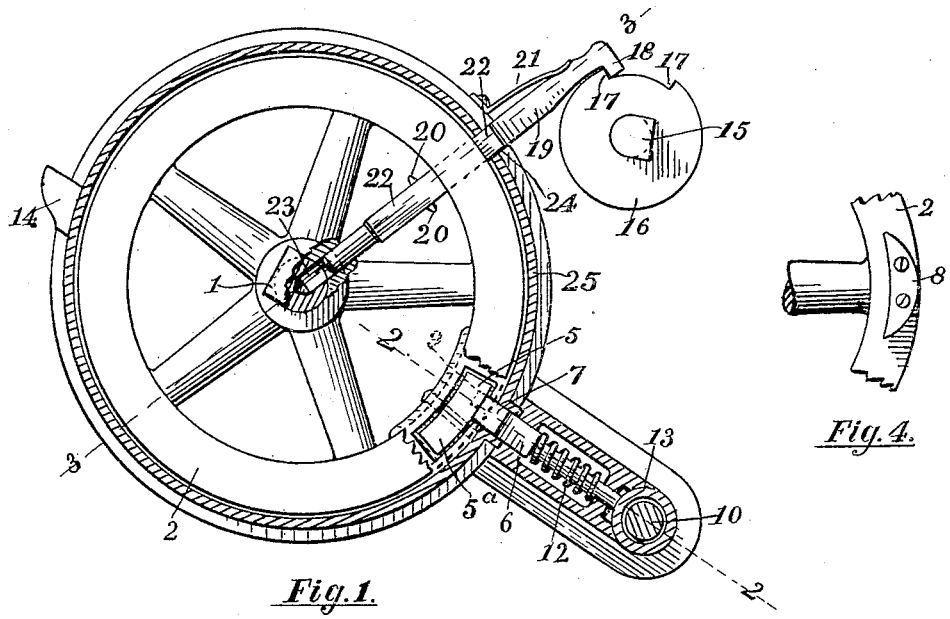
Fig.1.
Fig.4.
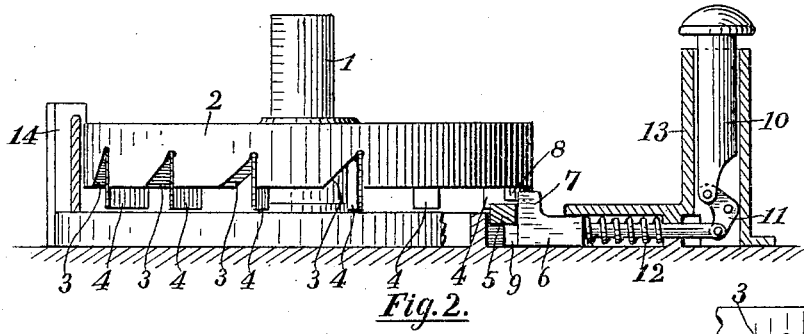
Fig.2.
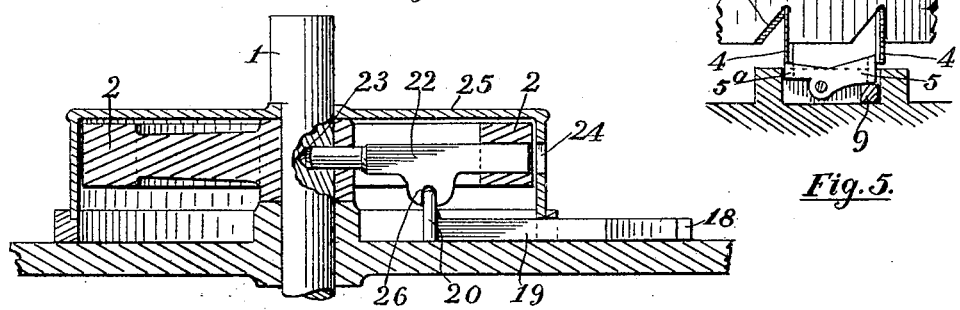
Fig.3.
Fig.5.
Witnesses
Palmer A. Jones
Georgiana Chace
Inventor
Henry E. Dubois
By Luther V. Moulton
Attorney

UNITED STATES PATENT OFFICE.

HENRY E. DUBOIS, OF GRAND RAPIDS, MICHIGAN.

CONTROLLER FOR ELECTRIC MOTORS.

No. 824,237.
Specification of Letters Patent.
Patented June 26, 1906.

Application filed January 20, 1906. Serial No. 297,031.

*To all whom it may concern:*

Be it known that I, HENRY E. DUBOIS, a citizen of the United States, residing at Grand Rapids, in the county of Kent and State of Michigan, have invented certain new and useful Improvements in Controllers for Electric Motors; and I do hereby declare the following to be a full, clear, and exact description of the invention, such as will enable others skilled in the art to which it appertains to make and use the same.

My invention relates to improvements in controllers for electric motors, and more particularly to such motors for railway-cars; and its object is to provide improved means for preventing the motorman from turning on the current too suddenly, to provide means for releasing the controller from such restraint when reversing the motor or in an emergency, and to provide the device with various new and useful features hereinafter more fully described, and particularly pointed out in the claims.

My device consists, essentially, of means for connecting and disconnecting the shaft that operates the rheostat from the restraining means when the motor is reversed, a wheel mounted on said shaft and provided with pivoted detents, a pivoted pawl to engage said detents, a movable support to maintain such engagement, and means for manually releasing the pawl as each detent is successively engaged therewith, and in the various combination and arrangement of the elements comprising the device, as will more fully appear by reference to the accompanying drawings, in which—

Figure 1 is a plan view of a device embodying my invention with parts broken away to show the construction; Fig. 2, the same in side elevation; Fig. 3, a vertical section of the same on the line 3 3 of Fig. 1; Fig. 4, a detail of the cam on the under side of the wheel; Fig. 5, a detail showing the relation of the pawl and detents.

Like numerals refer to like parts in all of the figures.

1 represents the operating-shaft of a rheostat such as is commonly used to control the electric motor of a railway-car, said shaft being operated by the usual key, which key engages the stop 14 when the current is cut off.

2 is a wheel journaled on the shaft 1 and provided with recesses 3 in the under side of its rim, said recesses having vertical sides in one direction and inclined sides in the other direction and arranged at suitable intervals corresponding to the various "points" of the rheostat.

4 represents detents pivoted at their upper ends in the upper angles of the recesses 3 and extending downward below the wheel to successively engage a pivoted pawl 5 beneath the wheel when the wheel is turned in the direction to turn on the current and turning on their pivots toward the inclined side of the recesses to pass freely over the pawl when the wheel is turned in the direction to cut off the current. This pawl is oppositely and alternately extended within the path of the detents 4 as the pawl is rocked upon its pivot.

6 is a horizontally-movable slide arranged radially to the wheel and having its end 9 adapted to extend beneath the pawl 5 and hold the same within the path of the detent 4. This slide is moved toward the pawl by a spring 12 and retracted by a vertically-movable plunger 10, connected to said slide by a bell-crank 11 and supported within a tubular casing 13.

15 represents the post of a reversing mechanism of the usual construction, on which post is fixed a wheel 16, having a recess in its margin forming shoulders 17 to engage a lug 18 on the end of a slide 9, extending radially beneath the wheel 20 and having its inner end provided with an upwardly-projecting member 20, which engages a recess 26 in the under side of a bolt 22, slidable radially in the wheel 2 and with its inner end adapted to be projected into an opening 23 in the shaft 1 to lock the wheel and shaft together and to be withdrawn from said opening to release the shaft to freely rotate within the wheel. The outer end of this bolt extends outward from the wheel when so withdrawn and enters an opening 24 in the case 25, and thus locks the wheel from turning when the shaft is released to turn within the same. On the slide 6 is an upwardly-projecting lug 7, which when the end 9 is beneath the pawl 5 projects beneath the wheel 2 and in the path of a cam 8, attached to the wheel, which cam has a convex outer face to engage the lug 9, and thus force the slide radially outward and retracts the end 9 from beneath the pawl to release the same. A spring 21 engages depressions in the slide 19, and thus yieldingly holds the same from moving, except when shifted by the shoulders 17 in the wheel 16.

In operation when the current is turned off the cam 8 retracts the slide 6 and releases the pawl, thus permitting the wheel to turn with the shaft 1 to the first point of the controller, when the pawl 5 engages the second detent 4 of the series and stops the wheel and shaft. The operator must now depress the plunger 10 and release the pawl, which falls by gravity and permits the wheel to move forward to the second point. The detent 4 in passing over the extension 5ª depresses the same and raises the pawl within the path of the next detent. The spring 12 then carries the end 9 of the slide 6 under the pawl and holds it until released, thus insuring step-by-step movement of the controller and preventing any sudden turning on of the current. Should the operator hold down the plunger 10, and thus prevent the slide from holding the pawl up, and an attempt be made to turn the current on rapidly, the pawl will be raised by the first detent, and being nearly equal in total length to the space between the detents it will not fall quick enough to clear the next detent, but will engage the same, and thus compel the operator to stop and perform the step-by-step movement. In turning off the current the detents turn on their pivots and pass freely over the pawl. When the key is in contact with the stop 14 and the current turned off, the wheel is then in position to bring the bolt 22 directly over the upwardly-projecting member 20 of the slide 19. If now the reverser is turned to reverse the current, the bolt 22 is withdrawn thereby and the wheel detached from the shaft 1, thus enabling the operator to turn on the current quickly for an emergency operation of the device. So long as the current is reversed the wheel remains locked in position and will be secured to the shaft 1 only when the current is turned off and the reverser restored to forward position.

What I claim is—

1. In combination with the operating-shaft of a rheostat, a wheel rotative on the shaft, a bolt slidable in the wheel and engaging an opening in the shaft, reversing mechanism, a wheel attached thereto, a slide operated by the wheel, and means for detachably connecting the slide and bolt.

2. The combination of an operating-shaft for a rheostat having an opening in its side, a wheel rotative on the shaft, a case surrounding the wheel and having an opening opposite the wheel, a bolt radially slidable in the wheel and alternately engaging the openings in the case, and the shaft, a radially-movable slide beneath the wheel and detachably connected to the bolt, a spring engaging the slide, a reverser, a wheel on the reverser-post and having a recess, and a lug on the slide and extending within the recess.

3. In combination with the operating-shaft of a rheostat, a wheel mounted on the same and rotative therewith, detents projecting downward from the wheel at intervals and pivoted thereto, a pawl beneath the wheel and pivoted intermediate its ends and also having its respective ends projecting alternately within the path of the detents, said pawl having a length substantially equal to the space between the detents.

4. In combination with the operating-shaft of a rheostat, a wheel attached thereto and having spaced-apart recesses in its under side, each recess being substantially vertical at one side, detents pivoted at their upper ends adjacent to the vertical sides of the recesses, a pawl beneath the wheel and intermediately pivoted, and also having its end alternately projecting within the path of the detents.

5. In combination with the operating-shaft of a rheostat, a wheel mounted thereon and rotative therewith, pivoted detents attached to the wheel, a pawl beneath the wheel and pivoted intermediate its ends and also having upturned ends alternately projecting within the path of the detents, a slide adapted to support one end of the pawl, and means for manually withdrawing the slide from engagement with the pawl.

6. In combination with the operating-shaft of a rheostat, a wheel rotative therewith, detents projecting downward from the wheel and pivotally attached thereto, a pawl beneath the wheel and pivoted intermediate its end, and also having upturned ends alternately projecting within the path of the detents, a longitudinally-movable slide projecting beneath one end of the pawl, a spring engaging the slide, a bell-crank lever attached to the slide to withdraw the same from beneath the pawl and a manually-operated plunger connected to the lever.

7. In combination with the operating-shaft of a rheostat, a reverser, a wheel mounted on the rheostat-shaft, a radially-movable bolt in the wheel and engaging an opening in the shaft, a wheel on the reverser-shaft, a slide operated by said wheel and detachably connected to the bolt, detents on the first-named wheel, a pawl beneath the same pivoted intermediate its ends, and also having upwardly-projecting ends alternately engaging the detents, a slide to support one end of the pawl, and manually-operated means for moving the slide out of engagement with the pawl.

In testimony whereof I affix my signature in presence of two witnesses.

HENRY E. DUBOIS.

Witnesses:
GEORGIANA CHACE,
LUTHER V. MOULTON.